Mar. 13, 1923.
W. PRELLWITZ.
SHAFT COUPLING.
FILED JUNE 13, 1922.
1,448,506.
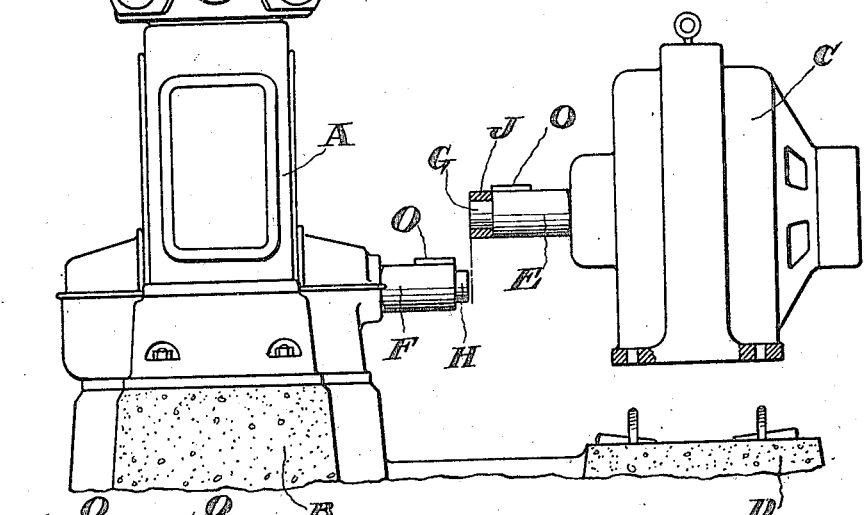
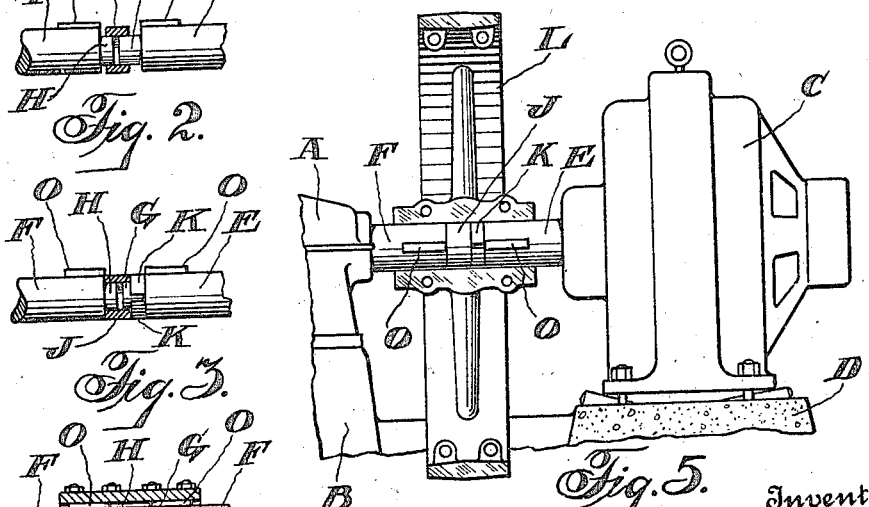

Patented Mar. 13, 1923.

1,448,506

UNITED STATES PATENT OFFICE.

WILLIAM PRELLWITZ, OF EASTON, PENNSYLVANIA, ASSIGNOR TO INGERSOLL-RAND COMPANY, OF JERSEY CITY, NEW JERSEY, A CORPORATION OF NEW JERSEY.

SHAFT COUPLING.

Application filed June 13, 1922. Serial No. 567,896.

*To all whom it may concern:*

Be it known that I, WILLIAM PRELLWITZ, a citizen of the United States, and a resident of Easton, in the county of Northampton and State of Pennsylvania, have invented a certain Shaft Coupling, of which the following is a specification accompanied by drawings.

This invention relates to shaft couplings particularly suitable for direct driven machines such for instance as electrically driven compressors, pumps, and the like, although the coupling may be used for connecting any suitable driving and driven shafts.

The objects of the invention are to enable two shaft ends, as the ends of the driving shaft of a motor and the crank shaft of a compressor or other machine, to be quickly and conveniently aligned, and coupled after one of the machines, usually the driven unit, has already been set on its foundations. By means of my coupling, the shafts may be quickly coupled, and then clamped together by suitable means such as a sleeve, or else a split pulley or a built up fly-wheel may be clamped over the coupling to hold the shafts together.

Further objects will hereinafter appear and to all of these ends the invention is shown in one of its preferred forms in the accompanying drawings, in which—

Figure 1 is a side elevation partly in section of an installation to which the invention is to be applied, Figure 2 is a detail view of the shaft ends partly broken away and partly in longitudinal section showing one step in adjusting the coupling, Figure 3 is a view similar to Figure 2 showing another step in adjusting the coupling, Figure 4 is a detail longitudinal sectional view partly broken away of the coupling showing a coupling sleeve for clamping the shaft ends together.

Figure 5 is a detail side elevation partly broken away of a portion of the installation showing a fly-wheel for clamping the two ends of the shafts together.

Referring to the drawings, a power unit is shown for purposes of illustration comprising in this instance, a vertical compressor A mounted on the foundation B, and an electric motor C for driving the compressor, adapted to be mounted on the foundation D. The end of the armature shaft E of the motor, forming the driving shaft, is adapted to be connected to the end of the crank shaft F of the compressor, forming the driven shaft. My improved coupling permits such connection and adjustment of the shafts in alignment in a simple and efficient manner.

As shown the meeting ends of the driving and driven shafts E and F are provided with reduced portions G and H respectively, preferably of different lengths, in this instance the reduced portion G being longer than the reduced portion H. A centering sleeve J is placed over the longer reduced shaft portion G and when the driving and driven shafts are centered and in substantial alignment, as in Figures 2 and 3, the centering sleeve J is moved over the shorter reduced shaft portion H and a filler ring K, preferably in two parts, is inserted in the space between the centering sleeve and the driving shaft E to fill said space. The centering sleeve is preferably shorter in length than the combined length of the reduced shaft portions G and H, and may be substantially equal in length to the longer of said reduced portions which in this instance is the portion G. By this means the shafts may be centered and maintained in alignment and then clamped together.

In Figure 1 the compressor A has been mounted on its foundations B and the electric motor C is shown in process of being mounted on its foundations D. In Figure 5 the complete installation is shown set up on the foundations, and in this instance, a built up or sectional fly-wheel L is adapted to be secured over the shaft ends E and F and keyed to the shafts, as by means of the keys O, thus clamping the driving and driven shafts together.

In the modification shown in Figure 4, a two part coupling sleeve P is shown keyed to the shaft ends for clamping the shafts together, and it is to be understood that any suitable means may be provided for this purpose.

My shaft coupling is simple, readily adjusted, and permits the shafts of the driving and driven units to be quickly assembled in alignment and properly centered and the coupling maintains the shafts in proper relationship.

I claim:

1. A shaft coupling comprising driving and driven shafts having reduced portions at their meeting ends, a centering sleeve over said reduced portions of the shafts, and means for clamping said shaft ends together.

2. A shaft coupling comprising driving and driven shafts having reduced portions at their meeting ends, a centering sleeve and a filler ring over said reduced portions of the shafts, and means for clamping said shaft ends together.

3. A shaft coupling comprising driving and driven shafts having reduced portions of different lengths at their meeting ends, a centering sleeve shorter than the combined length of the reduced portions placed over said portions, a filler ring adjacent the centering sleeve, and means keyed to the shafts for clamping said shaft ends together.

4. A shaft coupling comprising driving and driven shafts having reduced portions of different lengths at their meeting ends, a centering sleeve substantially equal in length to the longer of said reduced portions placed over said portions, an additional filler ring over one of said portions, and means keyed to the shafts for clamping said shaft ends together.

5. A shaft coupling comprising driving and driven shafts having reduced portions of different lengths at their meeting ends, a centering sleeve shorter than the combined lengths of the reduced portions placed over said portions, a two part filler ring adjacent the centering sleeve, and means keyed to the shafts for clamping said shaft ends together.

6. A shaft coupling comprising driving and driven shafts having reduced portions at their meeting ends, a centering sleeve over said reduced portions of the shafts, and a built up fly-wheel keyed to the shafts for clamping said shaft ends together.

7. A shaft coupling comprising driving and driven shafts having reduced portions at their meeting ends, a centering sleeve and a filler ring over said reduced portions of the shafts, and a built up fly-wheel keyed to the shafts for clamping said shaft ends together.

In testimony whereof I have signed this specification.

WILLIAM PRELLWITZ.